United States Patent Office.

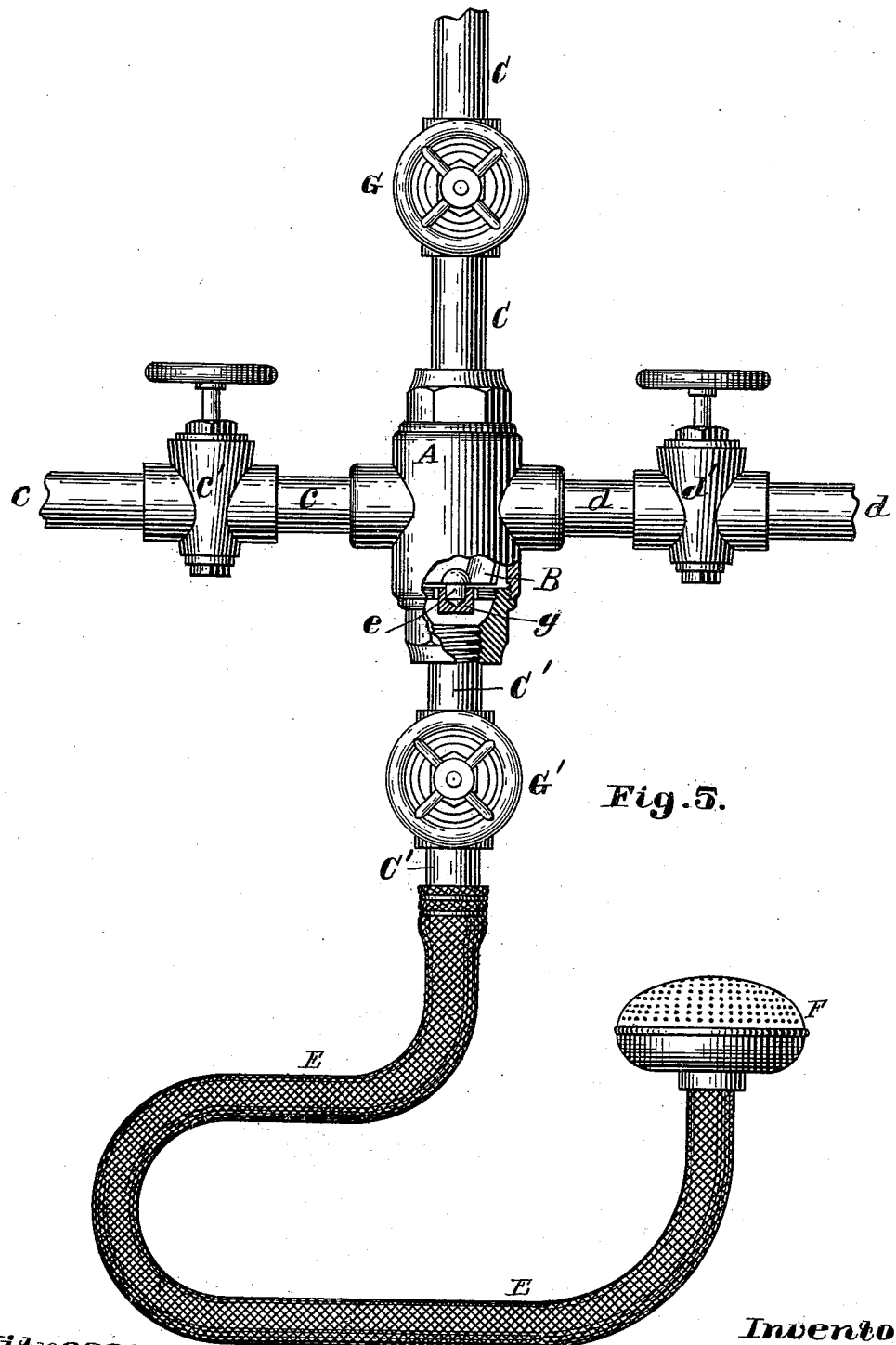

JOHN H. STEVENS, OF CAMBRIDGE, MASSACHUSETTS.

DEVICE FOR MIXING HOT AND COLD WATER FOR BATHING, &c.

SPECIFICATION forming part of Letters Patent No. 508,584, dated November 14, 1893.

Application filed July 5, 1892. Serial No. 438,919. (No model.)

*To all whom it may concern:*

Be it known that I, JOHN H. STEVENS, of Cambridge, in the county of Middlesex and State of Massachusetts, have invented a new and useful Device for Mixing Hot and Cold Water for Bathing and for other Purposes, of which the following, taken in connection with the accompanying drawings, is a specification.

My invention relates to douche, shower and other bathing apparatus and it consists in certain novel features of construction, arrangement and combination of parts whereby the hot and cold water may be automatically mixed, and the temperature of the water used be regulated to suit the desire of the user, which will be readily understood by reference to the description of the drawings and to the claims hereinafter contained, and in which my invention is clearly pointed out.

Figure 1:
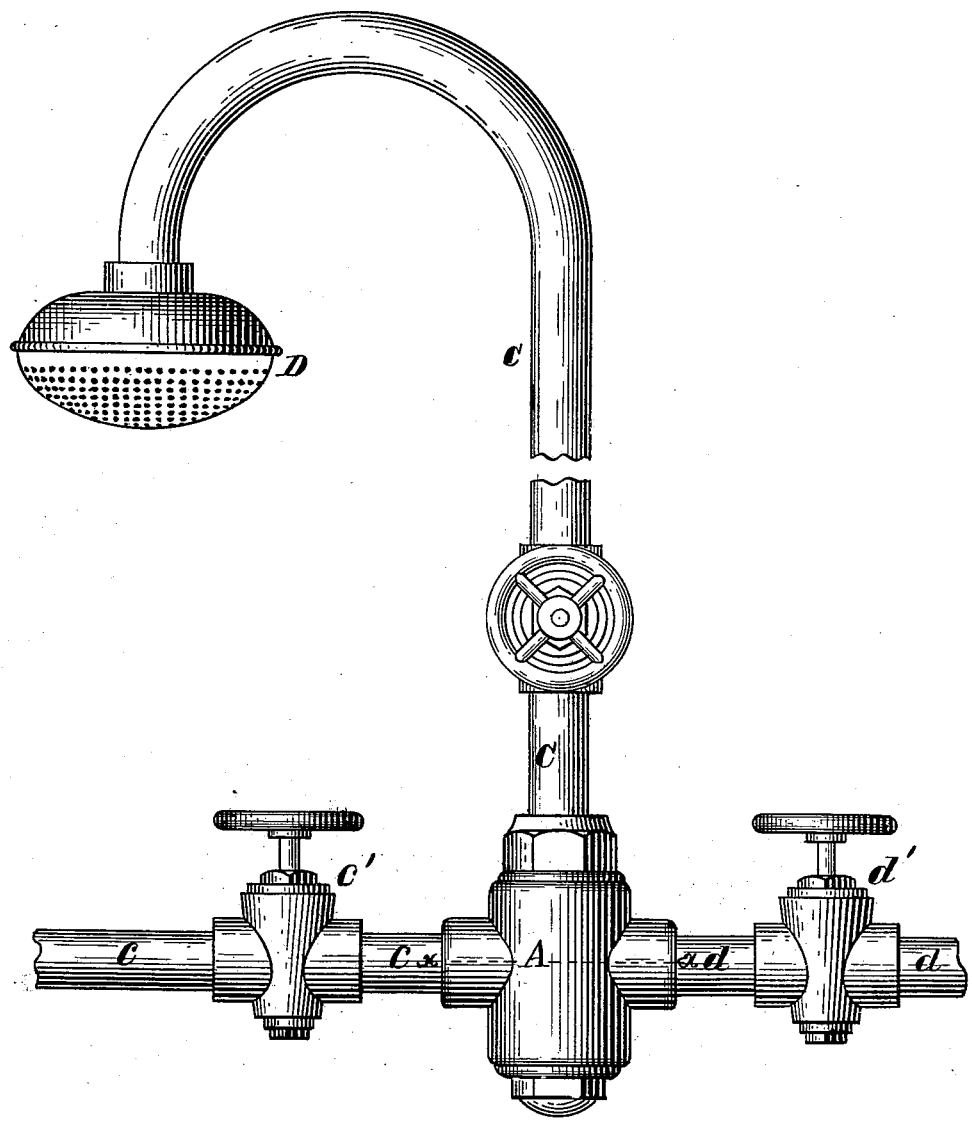
Figure 2:
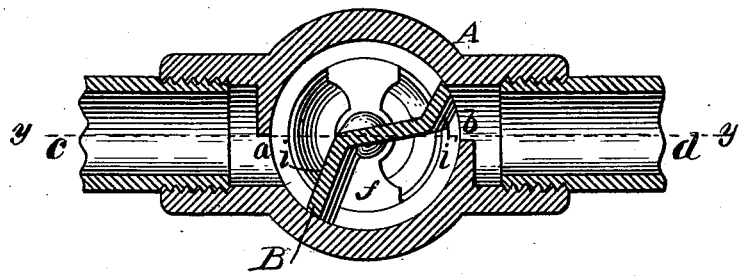
Figure 3:
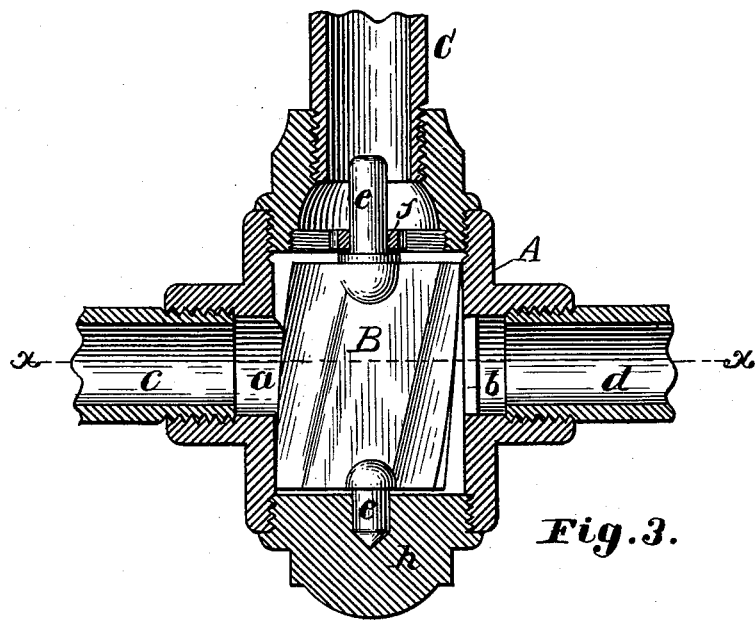
Figure 4:
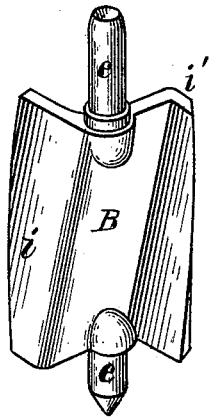

Figure 1 of the drawings is an elevation of my improved apparatus arranged for a shower bath only. Fig. 2 is a horizontal section through the mixer on line $x, x$, on Figs. 1 and 3, looking upward. Fig. 3 is a vertical section through the mixer casing on line $y, y$, on Fig. 2 and showing the revoluble agitator in elevation. Fig. 4 is a perspective view of the revoluble agitator, and Fig. 5 represents a partial elevation of my apparatus arranged to be used either as a douche or a shower bath.

In the drawings A is the mixer casing provided with the inlets $a$ and $b$ semi-circular in form said inlets being upon opposite sides of a vertical plane cutting the axis of said casing as shown in Fig. 3. Said mixer casing has screwed therein upon opposite sides thereof, and communicating with said inlet orifices $a$ and $b$ respectively the hot and cold water supply pipes $c$ and $d$ which are provided respectively with the valves $c'$ and $d'$ by which the flow of water may be regulated or entirely shut off.

Within the casing A is mounted, so as to be revoluble therein about a vertical axis, the agitator B in the form of a plate spanning the diameter of the interior of the casing and extending nearly the whole length of the chamber of said casing and provided with trunnions $e\ e$ which have bearing in the bars $f$ and $g$ or the bar $f$ and the head $h$ according as to whether the apparatus is to be used for the purposes of a douche and a shower bath, or a shower bath alone. The outer portion of each blade of the agitator is bent at an angle to the central portion and obliquely to the axis, so that each blade forms a section of a spiral of very steep pitch.

C is the discharge pipe through which the mingled and tempered water is discharged into the sprinkler D and C' is the discharge pipe set in the end of the casing A opposite to the pipe C and through which and the flexible tube E the water is conveyed to the douche sprinkler F, as shown in Figs. 1 and 5. The pipes C and C' are provided with valves G and G' respectively, by means of which the direction of the flow of the water from the mixer casing may be controlled by the operator.

The operation of my invention is as follows: The party desiring to take a shower bath and the several valves being closed he opens the valves G $c'$ and $d'$ when the hot and cold water entering the mixing chamber through the orifices $a$ and $b$ impinges upon the inclined surfaces $i$ and $i'$ of the agitator B causing it to revolve about its axis and thoroughly mix the two currents of water which then passes through the pipe C to the rose or sprinkler D from which it is discharged in a shower of spray in a well known manner. The operator after testing the temperature of the water discharged from the sprinkler turns one or both of the valves $c'$ and $d'$ to vary the quantity of water delivered through said valves until the water discharged from the sprinkler is of the desired temperature when he proceeds to take his shower bath. If he desires to use the apparatus as a douche he closes the valve G, takes the sprinkler F in one hand, opens the valve G and directs the streams of water to any part of the person desired.

By the use of my invention the hot and cold water are thoroughly mixed and the temperature of the water may be regulated to suit the taste or desire of the user.

What I claim as new, and desire to secure by Letters Patent of the United States, is—

1. The combination of a mixing chamber; a revoluble agitator plate mounted in bearing in said chamber; the hot and cold water inlet $a$ and $b$; and a discharge passage, said inlet passages opening into said chamber upon opposite sides thereof and upon opposite sides of a plane cutting longitudinally through the axis of said agitator and the axes of the pipes *c* and *d*.

2. The combination of a mixing chamber provided with two inlet passages opposite each other and upon opposite sides of a plane cutting longitudinally through the axis of said chamber and the inlet or supply pipes, an outlet or discharge orifice, and an agitator plate mounted in bearings in said chamber and having its outer portions bent at an angle to its center portion and inclined to its axis of revolution.

In testimony whereof I have signed my name to this specification, in the presence of two subscribing witnesses, on this 30th day of June, A. D. 1892.

JOHN H. STEVENS.

Witnesses:
   N. C. LOMBARD,
   A. D. SIMPSON.